May 8, 1923.
W. KRUEGER
POCKET MIRROR
Filed Aug. 30, 1919
1,454,678
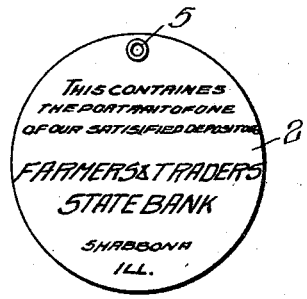
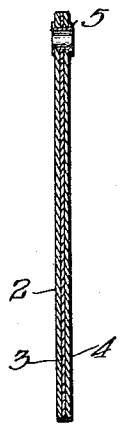
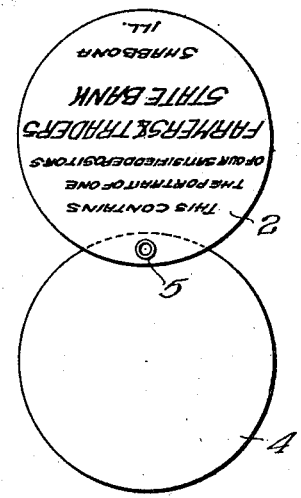
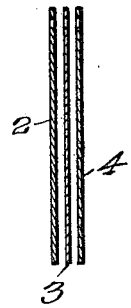
Witnesses:
Harry R. L. White.
W. F. Kilroy
Inventor:
Walter Krueger.
Frank M. Slough
Atty
By Patented May 8, 1923.

1,454,678

UNITED STATES PATENT OFFICE.

WALTER KRUEGER, OF CHICAGO, ILLINOIS, ASSIGNOR TO HARRY O. RUGH, OF CHICAGO, ILLINOIS.

POCKET MIRROR.

Application filed August 30, 1919. Serial No. 320,787.

*To all whom it may concern:*

Be it known that I, WALTER KRUEGER, an applicant for citizenship of the United States, residing at Chicago, in the county of Cook and State of Illinois, have invented certain new and useful Improvements in Pocket Mirrors, of which the following is a full, clear, concise, and exact description, reference being had to the accompanying drawings, forming a part of this specification.

My invention relates to certain improvements in pocket mirrors, and more particularly to such pocket mirrors as may be conveniently carried by the user, and which may be so carried without being subject to breakage.

It is a principal object of my invention to provide a novel and improved mirror of this general character wherein the mirror comprises a metal sheet having a high polished mirror surface and in which the polished surface is protected from damage when in use.

It is another object of my invention to provide a cover for the said metallic sheet to protect the polished surface and sheath the cutting edges of the metallic sheet so that it will not injure the pockets of the owner, or cut his hands when the mirror is handled.

I preferably stamp out the mirror and cover members in disc form but I do not limit my invention to circular discs as these may be made oval and other diverse forms.

It is a further object of my invention to provide a mirror polished surface by applying upon a steel or other base metal backing, a coat of nickel which produces a surface of high luster.

Another object of my invention is to provide a supplementary cover adapted to be placed between the outside cover of the mirror surface and said mirror surface, which supplementary cover is composed of a soft material such as a very soft paper, said supplementary cover being also of disc form. Another object of my invention is to provide a suitable surface upon which an advertisement may be placed on the main mirror cover disc.

Other objects of my invention and invention itself will be better understood from the description which follows and in which description reference will be had to the accompanying figures illustrating a further embodiment of my invention.

Figure 1, illustrates a front view of the mirror device of my invention in normal closed condition. In this view the front cover and an eyelet to secure the members together alone are shown.

Figure 2, shows a side cross-sectional view of the pocket mirror in normal closed position.

Figure 3, shows a front view of the mirror in operative or opened condition wherein the front cover is rotated about the securing eyelet as an axis to expose the polished mirror.

Figure 4, shows a side cross-sectional view of the three disc members, comprising the metallic mirror disc, the main cover disc and the intermediate supplementary disc.

Referring now to the figures in all of which like parts are similarly designated by like characters, at 4, I show a metallic disc member which is composed of a disc of sheet steel, one surface of which has been previously coated with a metallic coat of high luster and which coated surface is of high reflecting power. The mirror discs are stamped from large coated sheets of metal, such as steel or brass, and preferably at the same time the disc is stamped out it is perforated to form the rivet hole 5. The front cover is preferably stamped from a sheet of press-board, this likewise being preferably stamped with a perforation for the rivet 5. A supplementary disc adapted to be placed intermediate of the metallic main cover disc is stamped from a sheet of paper of very soft texture or as preferred, it may be some kind of soft cloth.

The front cover is shown in the Figure at 2, the intermediate supplementary cover at 3, and the metallic disc at 4, these all being perforated near an edge to admit a rivet member 5, which rotatably secures the three discs together; on the outside surface of the press-board main cover disc, a suitable advertising inscription may be placed as for instance, "This contains the portrait of one of our satisfied depositors", which inscription, would be followed by the name of the advertiser, distributing these mirrors to their trade.

Having thus described my invention, I wish it to be understood that while I have illustrated a specific embodiment of my in- vention, for the purpose of explaining my invention, I am aware that numerous and extensive departures may be made from the embodiment herein illustrated and described without departing from the spirit thereof, but what I claim as my invention is defined in the following claims.

Claims:—

1. In a mirror device, the combination with a metallic disc, coated on one side with a coating of high reflecting power, a protecting disc cover of soft material, and a main disc cover, said protecting disc cover being placed intermediate the said main cover and the said metallic disc, and a single rivet to so secure the said disc and covers together near an edge thereof, that said covers may be rotated edgewise on the said rivet.

2. As a new article of manufacture, a mirror disc comprising a base metal backing and a metallic coating of high luster, a protecting disc cover for the said coating, a second protecting disc cover intermediate the first named protecting disc cover and the said mirror disc, said first named cover being of hard fibrous material, said intermediate cover being of nonabrasive material, said outer cover having an outer surface for the placing of a suitable advertising inscription, an eyelet or equivalent rivet for securing the discs together near an edge thereof, at least one of said discs being edgewise rotatable about said eyelet, to expose the high luster metallic coating to view, and to cause polishing of the same by the said intermediate cover.

In witness whereof, I hereunto subscribe my name.

WALTER KRUEGER.